United States Patent [19]
Baturov et al.

[11] 3,819,110
[45] June 25, 1974

[54] METHOD FOR SUSPENSION SEPARATION AND APPARATUS FOR ACCOMPLISHING SAME

[76] Inventors: Vladimir Ivanovich Baturov, ulitsa Uritskogo, 10a, kv. 49; Yakov Khaimovich Prilutsky, ulitsa Markovnikova, 22, kv. 3; Viktor Ivanovich Shiborin, ulitsa Novomoskovskaya, 26, kv. 34, all of Dzerzhinsk Gorkovskoi oblasti; Dmitry Evseevich Shkoropad, korpus 3, kv. 82, Moscow, all of U.S.S.R.

[22] Filed: Jan. 15, 1973

[21] Appl. No.: 323,378

Related U.S. Application Data
[63] Continuation of Ser. No. 155,551, June 22, 1971, abandoned.

[52] U.S. Cl. .................................. 233/17, 233/38
[51] Int. Cl. ............................................. B04b 5/02
[58] Field of Search ............ 233/27, 28, 17, 18, 34, 233/38, 39

[56] References Cited
UNITED STATES PATENTS
289,261   11/1883   Hershey ............................. 233/18

| | | | |
|---|---|---|---|
| 736,976 | 8/1903 | Keiper | 233/18 X |
| 1,074,410 | 9/1913 | Crocker | 233/27 |
| 2,753,010 | 7/1956 | Walther | 233/27 X |
| R21,168 | 8/1939 | Coutor | 233/27 X |

*Primary Examiner*—George H. Krizmanich
*Attorney, Agent, or Firm*—Holman & Stern

[57] ABSTRACT

A method for the separation of suspensions under the effect of centrifugal forces in a thin liquid film formed on the surface of a body of revolution there is initially fed a lubricating fluid onto said surface to produce on said surface a liquid coat, followed by delivering onto said lubricating fluid coat the suspension to be separated and subjecting said suspension to the effect of centrifugal forces. An apparatus for accomplishing said method is disclosed in which above the surface of each body of revolution there is disposed a guiding element mounted on a vertical shaft so as to form a clearance in relation to said surface, with said guiding element being intended to shape the film stream of the suspension to be separated on the surface of a lubricating fluid coat produced by the lubricating fluid fed through holes in the vertical shaft wall.

5 Claims, 2 Drawing Figures

PATENTED JUN 25 1974  3,819,110

METHOD FOR SUSPENSION SEPARATION AND APPARATUS FOR ACCOMPLISHING SAME

This application is a continuation of application Ser. No. 155,551, filed June 22, 1971, now abandoned.

BACKGROUND OF THE INVENTION

This invention relates to the field of suspension separation into a solid component and a liquid component and, more specifically, to a method and an apparatus for separating suspensions under the effect of centrifugal forces in a thin liquid film formed on the surface of a body of revolution and having a free surface. The present invention may be useful for the separation of suspensions in chemical, mining, foodstuff and other industries.

PRIOR ART

The known methods for the separation of suspensions comprise feeding a stock suspension onto the surface of a rotating body of revolution in the form of a thin film, separating said film on said surface under the effect of centrifugal forces, and collecting separately the solid particles which fly off the free surface of said liquid film and the liquid fraction which flows as a continuous film down the surface of the body of revolution.

There are also known in the art apparatus for the separation of suspensions in a liquid film having a free surface, with provision being made in said prior art apparatus for at least one body of revolution mounted on a hollow vertical shaft with perforations in the walls thereof, in which said body of revolution is disposed within a shell furnished with side pockets for solid fraction collection, a drain, a liquid fraction collection chamber, and a stock suspension feed pipe.

However, the known methods and apparatus are of inadequate throughput capacity and do not provide for a high degree of suspension separation due to the fact that the liquid film of a suspension being separated, while flowing down the surface of a solid body, overcomes marked drag, so that the velocity of liquid stream flow is relatively low and, consequently, the absolute magnitude of the centrifugal force which acts upon solid particles in the zone of solid particle detachment from the liquid film free surface is also inadequate.

OBJECTS AND SUMMARY OF THE INVENTION

It is an object of the present invention to obviate or mitigate these disadvantages.

It is the principal object of the present invention to provide a method for the separation of suspensions in a liquid film and an apparatus for accomplishing the same which are capable of enhacing significantly the throughput capacity of the process for suspension separation and make it possible to attain a higher degree of suspension separation.

This object is accomplished by a method of separating suspensions under the effect of centrifugal forces in a thin liquid film having a free surface, formed on the surface of a rotating body of revolution wherein, according to the invention, a lubricating liquid having a higher adhesiveness than the suspension is first supplied onto the surface of a body of revolution to form a coat on the surface, and then the suspension is supplied onto the surface of the coat.

It is preferable that the stock suspension be subjected to pre-thickening, so that, after separating the clarified liquid fraction, the resulting thickened fraction is delivered onto the surface of a lubricating fluid coat formed on the surface of a body of revolution.

Preferably in the apparatus for suspension separation comprising at least one body of revolution mounted on a vertical hollow shaft provided with perforations in the shaft wall, said body of revolution being accommodated in a shell having pockets for solid fraction collection, a drain and a liquid fraction collection chamber, provision is made, according to the present invention, for disposing guiding elements above the surface of each body of revolution and with a clearance in relation to said surface, with said guiding elements being mounted on said vertical shaft and serving for shaping the film stream of the suspension to be separated on the surface of a lubricating fluid coat, said lubricating fluid being supplied via perforations in the vertical shaft wall.

In the present apparatus for suspension separation, the guiding elements should preferably be mounted on the vertical shaft and adapted to be displaced along the axis thereof with a view to adjusting the clearance between said guiding elements and the surface of a body of revolution.

The guiding elements may be made in the form of trays expanding downwardly and having radial ribs on the external side.

The method and apparatus for suspension separation, according to the present invention, accomplish in an efficient manner the objects set forth hereinabove.

For a better understanding of the present invention, the method for suspension separation and exemplary embodiments of the apparatus for carrying out said method are described hereinafter in detail and with reference to the accompanying drawings, wherein:

DETAILED DESCRIPTION OF THE INVENTION

The present method of suspension separation and the apparatus for accomplishing the same are based on the known hydrodynamic phenomenon of solid particles separation from the free surface of a film under the effect of centrifugal forces.

Where the stock suspension is fed in the form of a thin film onto the surface of a rotating body of revolution, the solid fraction particles contained in the suspension being separated will tend to float to the film surface under the effect of centrifugal forces and, on overcoming the force of surface tension will be detached from the surface of said film and thrown into appropriate receivers, while the liquid fraction will flow down the surface of the body of revolution into collection chambers.

The method of the present invention includes feeding initially a lubricating fluid onto the surface of a body of revolution so as to obtain a uniform film stream of said fluid directed from the axis of rotation to the periphery of said body of revolution, followed by delivering onto said lubricating fluid film the suspension to be separated. Said suspension in the form of a continuous film flows from the central part of the body of rotation to the periphery thereof over the lubricating fluid film, which film also flows in the direction from a axis of rotation to the periphery of the body of revolution. This situation results in increasing the absolute velocity of the suspension stream and is, therefore, conducive to a more vigorous expulsion of solid fraction particles from the suspension film surface and provides for a higher separation efficiency. Another advantage of the present method stems from the fact that the suspension film flow over a lubricating fluid film eliminates the effect of roughness intrinsic in the surface of the body of revolution on the rate of suspension film flow, whereby the degree of suspension separation is increased.

In carrying out the method of the invention, use is made of a lubricating fluid selected from the liquids noted for their greater viscosity and higher adhesiveness as compared to the liquid component of the stock suspension. When the suspensions to be separated are aqueous suspensions, these requirements are met by glycerol, aqueous solutions of glycerol, various oils and other viscous liquids or solutions.

To obviate slack time during suspension separation in a film and, hence, to enhance the efficiency of the process of suspension film separation, it is preferable to subject the stock suspension to pre-thickening, followed by discharging the clarified liquid fraction and feeding only the thickened fraction onto the surface of the body of revolution.

The method of suspension separation outlined hereinabove may be practised by resorting to the apparatus shown in FIGS. 1 and 2.

Figure 1:
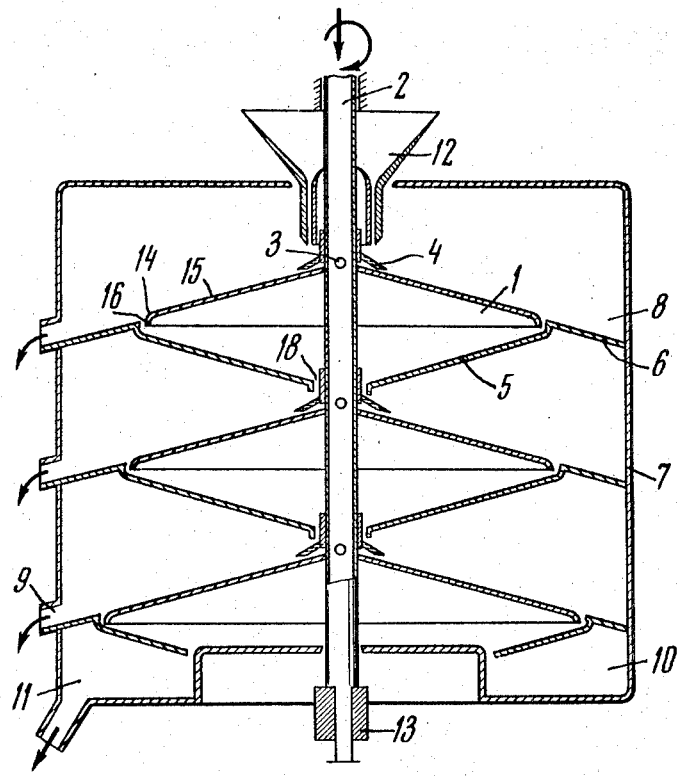
FIG. 1 is a sectional view of an apparatus, according to the invention.
Figure 2:
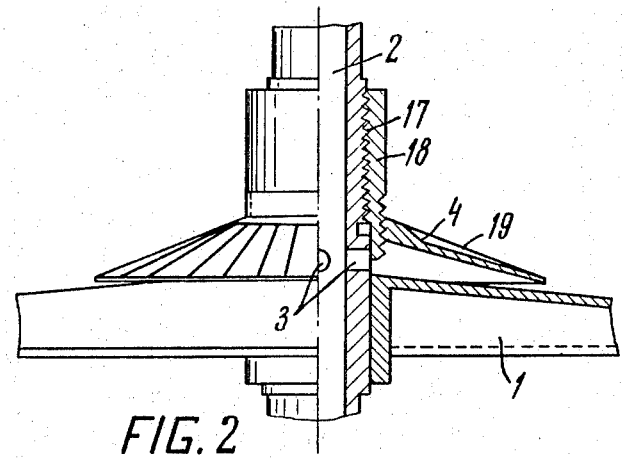
FIG. 2 shows an exemplary embodiment of guiding elements and a method of mounting the elements on a vertical shaft.

As can be seen in FIG. 1, the apparatus comprises a plurality of disks 1, whose diameters increase progressively, with said disks 1 being mounted on a vertical hollow shaft 2, in the wall of which shaft 2 provision is made for apertures 3 for delivering a lubricating fluid onto the surface of the disks 1, said lubricating fluid being supplied through the bore of the shaft 2. A guiding element 4 in the form of a downwardly expanding tray 4 is mounted above each disk 1, while under each disk 1 there is provided an arrangement for draining the liquid fraction, with said arrangement being in the form of a funnel 5 held in place by shelves 6 on the side wall of a shell 7 of the apparatus. The shelves 6 build up side pockets 8 for collecting the solid fraction, which fraction is discharged from said pockets 8 via outlets 9, whereas the liquid fraction accumulates in collection chamber 10 provided with a connecting pipe 11 for liquid fraction discharge from the apparatus. In the upper part of the apparatus shell 7 there is mounted a stock suspension feeder 12. The shaft 2 is mounted in bearings 13 and is set in motion by a drive (not shown in the figures).

The present apparatus operates as follows:

A lubricating fluid fed continuously through an appropriate connecting pipe (not shown in the figures) in the cavity bore of the shaft 2 issues from the apertures 3 in the shaft wall, passes through a clearance between the surfaces of the disks 1 and the edges of the trays 4 and spreads in the form of a uniform and continuous film on the surfaces of the disks 1, with the direction of lubricating fluid film motion being from the axis of said disks 1 to the periphery thereof. Next, the stock suspension is delivered continuously via the feeder 12 onto the surfaces of the guide trays 4, flows from the axes of said trays 4 to the periphery thereof, and overflows from the tray edges onto the surface of the lubricating fluid coat previously formed on the surfaces of the disks 1. At the points located on line 14, along which line flattened inclined sections 15 of the surface of the disks 1 are smoothly conjugated with steep sections 16 of the disk surfaces, the solid particles contained in the suspension being processed are detached from the suspension film under the effect of centrifugal force and hurled into the pockets 8. The liquid component fraction of the suspension overflows, together with the lubricating fluid film, from the upper disk 1 into the funnel 5, from whence it comes onto the guide tray 4 of the next disk 1 and thereupon overflows onto the lubricating fluid coat formed on the surface of said second disk 1. Finer solid particles are detached from the suspension film on the second disk 1, since the diameter of said second disk 1 exceeds that of said first disk 1.

Hence, in the course of suspension separation in each pocket 8 disposed opposite a respective disk 1 there collects a fraction of solid particles having a definite particle size. The liquid component of the suspension overflows from one disk 1 to another until it reaches the last (bottom) disk 1, from whence the liquid fraction enters the collection chamber 10 and is discharged therefrom, via the connecting pipe 11, into a receiver tank (not shown in the figures).

The thickness of the lubricating fluid coat on the surface of the disks may be controlled, depending upon the properties of the lubricating fluid used. In order to control the thickness, the guide trays 4 are mounted on the vertical shaft 2 and adapted to be displaced along the shaft axis through the use of a screw thread, with said screw thread being used to secure webs 18 of the guide trays 4 on the vertical shaft (FIG. 2). Radial ribs 19 on the external surface of the guide trays 4 serve to prevent suspension film slippage along the surface of said trays.

The description given hereinabove pertains to a specific embodiment of the apparatus for the separation of suspensions, according to the present invention. In said embodiment of the apparatus, there occurs partial intermixing of the suspension and the lubricating fluid when the suspension being separated overflows from one disk to the next one. Where said intermixing is detrimental, provision may be made in the apparatus for only one body of revolution having a continuous surface built up by smoothly conjugated stages, with each stage being similar in shape to the disks of the apparatus disclosed earlier and the diameters of successive stages gradually increasing on passage from the top to the bottom stage.

It will be readily appreciated by those skilled in the art that the scope of the present invention is not limited by the preferred embodiments thereof disclosed herein.

We claim:

1. A method for separating suspensions under the effect of centrifugal forces in a thin liquid film having a free surface, formed on the surface of a rotating body of revolution, comprising the steps of first supplying a lubricating liquid having a higher adhesiveness than the suspension onto said surface to form a coat on said surface, and then supplying the suspension to be separated onto the surface of said coat.

2. The method for separating suspensions as claimed in claim 1, comprising first dividing the suspension into liquid and solid component parts, withdrawing the liquid component part and supplying the solid component part onto the surface of the lubricating liquid coat.

3. An apparatus for separating suspensions, comprising a shell, a vertical hollow shaft having perforations in its vertical wall, bearings for said shell in which said shaft is mounted, at least one body of revolution mounted on said vertical shaft, means for draining the liquid component part of the suspension being separated, said draining means being mounted on the walls of the shell under said body of revolution, means for collecting the solid component part of the suspension being separated, said collecting means being defined by an annular pocket mounted on the side wall of the shell above the draining means, means for collecting the liquid component part after drainage, means for supplying a suspension, said supplying means being mounted above said body of revolution and defined by a funnel-shaped feeder, a guide disc flaring out downwardly, said guide disc being mounted on said vertical shaft above the body of revolution with a clearance in relation to the surface thereof, said guide disc being so located with respect to said body of revolution in height that the perforations in the vertical wall of the shaft are disposed between the disc and the body of revolution.

4. The apparatus as claimed in claim 3, in which said guide disc is mounted on said vertical shaft and means being provided to move said guide disc along the axis of the shaft to adjust the clearance between the edges of the disc and the surface of the body of revolution.

5. The apparatus as claimed in claim 3 in which said guide disc is provided with radially extending ribs.

* * * * *